Figure 1:
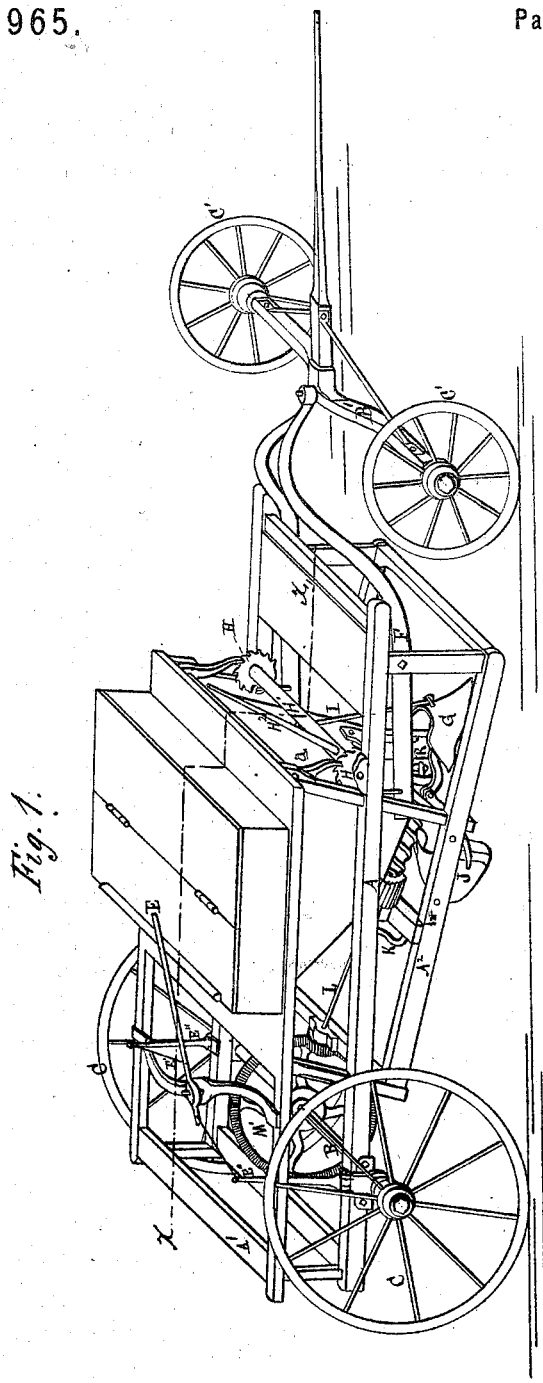

C. SVENDSEN.
Potato-Planters.

No. 140,965.

2 Sheets--Sheet 1.

Patented July 15, 1873.

Witnesses.
Harry Clark
H. E. Matthews.

Inventor.
C. Svendsen
by Dyer, Beadle & Co.
Attys

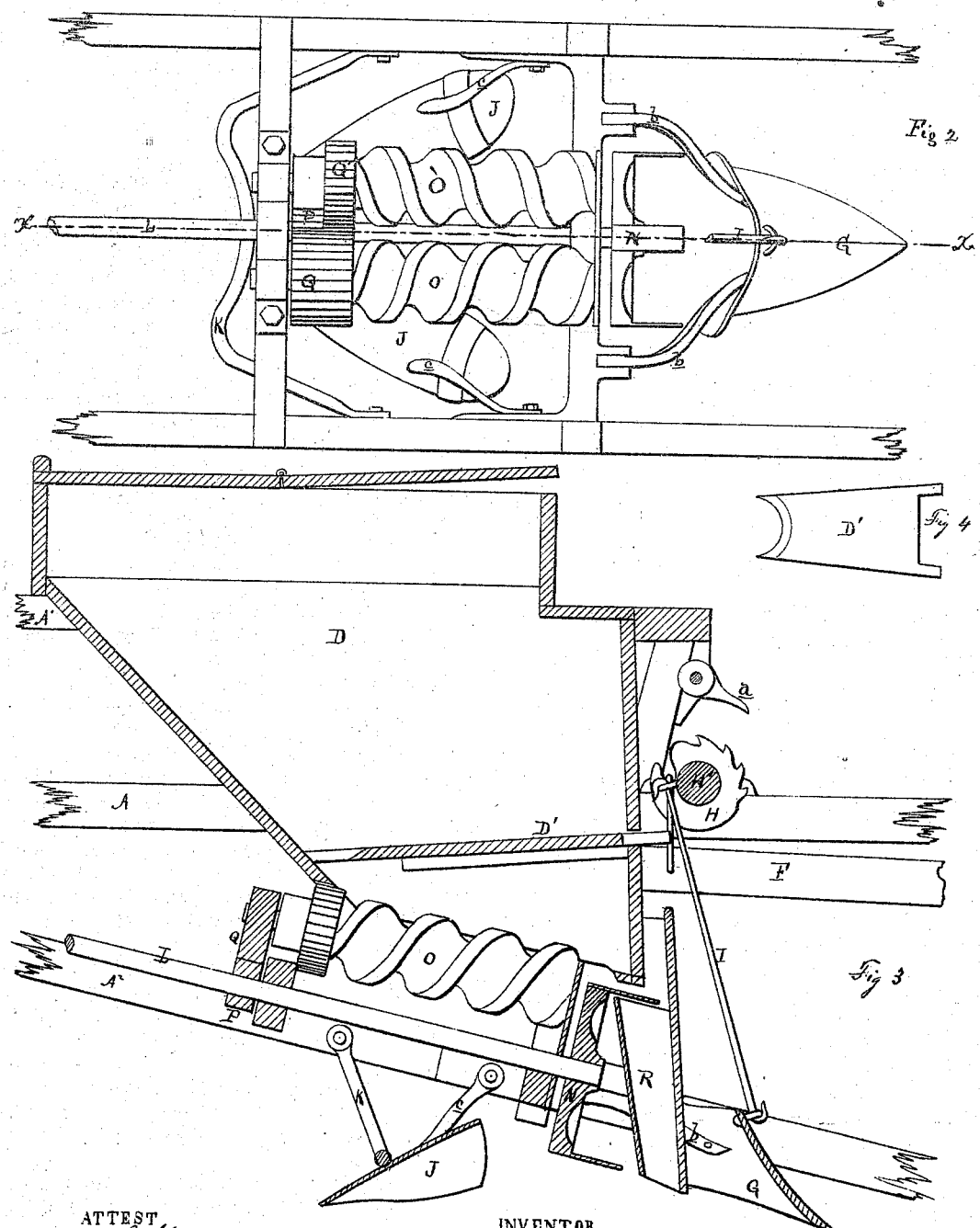

UNITED STATES PATENT OFFICE.

CHRISTIAN SVENDSEN, OF BLAIR, NEBRASKA.

IMPROVEMENT IN POTATO-PLANTERS.

Specification forming part of Letters Patent No. 140,965, dated July 15, 1873; application filed September 24, 1872.

*To all whom it may concern:*

Be it known that I, CHRISTIAN SVENDSEN, of Blair, in the county of Washington and State of Nebraska, have invented a new and useful Improvement in Potato-Planters; and I do declare that the following is a true and accurate description thereof, reference being had to the accompanying drawings and to the letters of reference marked thereon, and being a part of this specification, in which—

Figure 1, Sheet 1, is a perspective view of the machine. Fig. 2, Sheet 2, is a sectional plan of the planting-gear on the plane of the main frame. Fig. 3 is an enlarged vertical longitudinal section of the same on the line $x$ $x$ in Figs. 1 and 2, and Fig. 4 is a plan of the bottom slide of the hopper.

Like letters refer to like parts in each figure.

The nature of this invention relates to an improved machine for planting potatoes, by which the several operations of opening the furrow, planting the potatoes, and covering them in are performed in once passing over the ground; and it consists in a main frame, supported at the back part by a pair of traction-wheels, which also give motion to the planting mechanism through suitable clutch-boxes, by which they are thrown in and out of gear therewith. The front part of the main frame carries an adjustable crane-neck, the outer end of which is pivoted to a pair of leading-wheels and their axle, and supports the front end of the frame in such a manner that it may be raised or lowered to clear the plows from the ground, or to regulate the depth of furrow. The front part of the frame carries a hopper with a slide-bottom, which delivers the potatoes to a pair of worms revolving side by side under it, which carry the seed along to the dropper-spout. There is also a plow adjustably suspended under the frame to open the furrow in front of the dropper-tube, and a covering-apron or reversed double shovel behind it for covering the furrow after planting. It also consists in the general construction and arrangement of the various parts, for the purposes as more fully hereinafter set forth.

In the drawing, A represents a long rectangular frame, having journaled in pendent boxes at the back a transverse axle, B, on the ends of which rotate a pair of traction-wheels, C. Above the main frame is erected a lighter upper frame, $A^1$, and below the main frame is a lower frame, $A^2$, extending forward from a point a little behind the middle to the front, and inclined downward and forward, as seen in Fig. 1. D is a hopper suspended from the upper frame, and is provided at the bottom, which is shaped like an inverted truncated pyramid, with a regulating-slide, D', Figs. 3 and 4, inclined downward toward the rear end of the machine. The inner ends of the hubs of the wheels C have clutch-faces, with which may be caused to gear clutch-boxes on the axle B by means of a lever, E, within reach of the driver, who sits on the hopper, through the links E' E' and clutch-levers E'' E'', Fig. 1, for the purpose of compelling the axle to rotate with said wheels. The front end of the frame is supported by the crane-neck F, bifurcated, as seen in Fig. 1, and pivoted at about the middle of each member to the front corner-posts of the frames A $A^2$. The rear ends of the crane-neck are suspended by links to the wrists at the back of the ratchets H at each end of a shaft, $H^1$, journaled in the frame A in front of the hopper. $a$ are pawls, which engage with the ratchets, and $H^2$ is a lever, which the driver can use to turn the shaft $H^1$, and thus raise the rear ends of the crane-neck, whose front end is pivoted on the front axle B' by its king-bolt, said axle carrying the fore-wheels C, and is provided with a pole and whiffletrees for hitching the team to the implement. By driving down the lever $H^2$ the driver raises the front end of the frame, and vice versa. G is a double mold-board plow, pivoted at its rear corners by short arms $b$ to a girt in the lower frame $A^2$, and is suspended by a rod, I, to the shaft $H^1$ above, so that it may be raised or lowered thereby at the same time the frame-work is. This plow opens the furrow to any required depth, or may be raised to clear the ground entirely. J is a covering device, shaped like a large double mold-board, and is pivoted by arms $c$ to the lower frame behind the plow G, but in a reversed position. Its office is to sweep back the earth turned up by the plow G into the furrow again and cover the seed. It is held down by a bail, K, Fig. 3. L is a shaft longitudinally journaled in the lower frame, and is rotated by a pinion, M, at its rear end, meshing with a crown-wheel, M', on the rear axle. The front end of this shaft carries a wheel, N, with long flat projecting crown teeth or blades, which assist in leveling the earth into the furrows, shown in Figs. 2 and 3. The planting mechanism consists of a pair of worms, O O', journaled in girts in the lower frame $A^2$, running in the bottom of the hopper under its slide. The shaft L has a spur-wheel, P, which meshes with a pinion, Q, on one of the worms, which in turn meshes with a pinion, Q', on the other worm, and thus both are rotated in opposite directions in the advance of the machine, and carry along the potatoes dropped from the hopper-slide on their rear ends or between them to the front ends, where they fall through a planting-spout, R, into the furrow behind the plow G.

What I claim as my invention, and desire to secure by Letters Patent, is—

1. The construction and arrangement, with relation to the hopper D, of the shaft L, pinions P Q Q', worms O O', and spout R, all operated by the traction-wheel axle for planting or dropping the potatoes in the furrow, substantially as described and shown.

2. The wheel N, adapted to revolve by means substantially as described, when arranged, relatively to the worms O O' and dropper-spout R, as described, for the purpose set forth.

CHRISTIAN SVENDSEN.

Witnesses:
WM. H. LOTZ,
GEORGE FERRIS.